(12) United States Patent
Shaaban et al.

(10) Patent No.: US 10,896,470 B2
(45) Date of Patent: Jan. 19, 2021

(54) MODIFIED CASH LEDGER BASIS FOR AN ACCOUNTING SYSTEM AND PROCESS

(71) Applicant: Fulcrum Global Technologies, Inc., Chicago, IL (US)

(72) Inventors: Ahmed Farouk Shaaban, South Barrington, IL (US); Venkat Thandra, South Barrington, IL (US)

(73) Assignee: FULCRUM GLOBAL TECHNOLOGIES INC., Chicago, IL (US)

( * ) Notice: Subject to any disclaimer, the term of this patent is extended or adjusted under 35 U.S.C. 154(b) by 137 days.

(21) Appl. No.: 15/465,250

(22) Filed: Mar. 21, 2017

(65) Prior Publication Data

US 2017/0193607 A1 Jul. 6, 2017

Related U.S. Application Data

(63) Continuation of application No. 14/544,385, filed on Dec. 31, 2014, now abandoned.

(60) Provisional application No. 61/999,408, filed on Jul. 26, 2014.

(51) Int. Cl.

| | |
|---|---|
| *G06Q 40/00* | (2012.01) |
| *H04L 9/06* | (2006.01) |
| *G06Q 20/38* | (2012.01) |
| *G06Q 40/02* | (2012.01) |
| *G06Q 20/40* | (2012.01) |
| *G06Q 40/06* | (2012.01) |

(52) U.S. Cl.
CPC ........... *G06Q 40/12* (2013.12); *H04L 9/0643* (2013.01); *G06Q 20/389* (2013.01); *G06Q 20/3829* (2013.01); *G06Q 20/401* (2013.01); *G06Q 40/00* (2013.01); *G06Q 40/02* (2013.01); *G06Q 40/06* (2013.01); *G06Q 2220/00* (2013.01); *G06Q 2220/10* (2013.01)

(58) Field of Classification Search
CPC .. G06Q 20/00; G06Q 2220/00; G06Q 20/401; G06Q 20/389; G06Q 20/3829; G06Q 2220/10; G06Q 40/02; G06Q 40/12; G06Q 40/06; G06Q 40/00; H04L 9/0643
USPC ......................................................... 705/30
See application file for complete search history.

(56) References Cited

U.S. PATENT DOCUMENTS

| | | | | |
|---|---|---|---|---|
| 5,875,435 A | * | 2/1999 | Brown | G06Q 20/10 705/30 |
| 7,761,591 B2 | * | 7/2010 | Graham | G06Q 40/02 709/204 |

(Continued)

*Primary Examiner* — Peter Ludwig
(74) *Attorney, Agent, or Firm* — Global IP Counselors, LLP (57) ABSTRACT

A business system and process which utilizes an improved method of providing accounting methods for entering, updating and posting financial events, as well as an improved method for updating simultaneously a plurality of ledgers and sub-ledgers according to a preselected set of parameters or rules, which provides improved real time reporting capabilities to management, staff, partners and others. The improved system and method manipulates, stores, and reports on ledger items including, but not limited to: statutory cash ledgers, cash and accrual ledgers, and management cash ledgers and similar accounting ledgers commonly utilized in the relevant art of professional time, record and accounting keeping.

10 Claims, 12 Drawing Sheets

(56) References Cited

U.S. PATENT DOCUMENTS

| | | | | |
|---|---|---|---|---|
| 2010/0030671 A1* | 2/2010 | Gelerman | ............ | G06F 21/6218 |
| | | | | 705/30 |
| 2012/0059746 A1* | 3/2012 | Thomas | ................ | G06Q 40/02 |
| | | | | 705/30 |
| 2015/0288694 A1* | 10/2015 | Liebl, III | ................ | G06F 21/31 |
| | | | | 713/182 |

* cited by examiner

Final Invoice 9020004000 (ZL2) Display: Overview of Billing Items — 700

Accounting  Billing documents

ZL2 Final Invoice ▼ 9020004000 — 702

Net Value  2,919.54  EUR — 708

Payer  263  Awash International Bank S.C / Kirkos Sub-City, Addis ... — 704

Billing Date  07/05/2014

706

| Item | Description | Billed Quantity | S... | Net value | Material |
|---|---|---|---|---|---|
| 10 | Soft Cost | 100 PC | | 138.00 | SOFTCOST |
| 20 | FEE | 6.0 HR | | 2,700.00 | FEE |
| 30 | Hard Cost | 1 EA | | 81.54 | HARDCOST |

MODIFIED CASH LEDGER BASIS FOR AN ACCOUNTING SYSTEM AND PROCESS

CROSS-REFERENCE TO RELATED APPLICATION

The instant application is a continuation of co-pending application entitled "Modified Cash Ledger Basis for An Accounting System and Process" having U.S. patent application Ser. No. 14/544,385 and filed Dec. 31, 2014, the teachings of which are incorporated herein by this reference.

FIELD

The exemplary and non-limiting embodiments of the present invention relate generally to the field of a business method and process concerning the basis of accounting for any professional firm, including, in particular, a method for providing a combination of accrual and cash accounting, a system that has the ability to maintain multiple Modified Cash Ledgers plus the ability to post transactions to the Management Cash Ledger based on preselected criteria.

BACKGROUND

Currently in the market place, there are a number of computerized systems and methods for manipulating, modifying, and editing transactional data relating to income and expenses for a business. Some of these exemplary systems and methods in the prior art are shown below.

In U.S. Pat. No. 8,543,476 is disclosed a system and method for cash based accounting in a general ledger wherein the system will post a payment, which contains at least one line item to a bank account and simultaneously this transaction will automatically clear a business partner account by posting the payment into the database. This method may also include determining a revenue account from the cleared business partner account and additionally clearing the at least one line item therefrom. In another exemplary embodiment, a cash ledger is provided together with a clearing account and both may be simultaneously updated. This method is unlike the present invention, because the present invention adds to the prior art in several areas, including the inventive features of providing sets of rules for transferring items into a plurality of accounts simultaneously and updating transactions therein.

In U.S. Pat. No. 7,654,445 is described a system and method for revenue and expense realignment wherein a set of rules engine receives revenue and or expense transactions, from which the method may execute a series of steps to transform inbound transactions which are further posted elsewhere. However, this system is primarily concerned with accounting methods for per product bases, apportionment of various costs among constituent companies and cost increases concomitant with data security and consistency. It is noted that this disclosure is concerned with RECAST or revenue and expense tracking system. Unlike the present invention, it does not differentiate between localized statutory rules, nor does it disclose use for a calculating a profit and loss statement or balance sheet or management reports in a plurality of currencies.

Regarding U.S. Pat. No. 8,768,793, this patent discloses the use of a method for reposting transactional documents wherein a new transaction document is generated in response to a command to edit the original transaction document. Next, the new document is modified and saved as such. The original postings are then nullified. However, the changes are done by the user of the system, there is no true automation by which a set of rules and/or coding can modify, alter or even ignore an event, and this disclosure is not at all concerned with larger companies handling a plurality of management reports in a plurality of currencies. The disclosure is primarily focused to allow users to alter and change accounting transactions, while at the same time preserving the original data entered so as to ensure database integrity for auditing and tax purposes.

In the prior art, there are systems in the field of a business method and process related to the basis of accounting for any professional firm; however, the prior art does not provide for a system or method as the present invention. In particular, the prior art clearly lacks a method for providing a combination of accrual and cash accounting, a system that has the ability to maintain multiple parallel ledgers including modified cash ledgers, statutory accrual ledgers, and statutory cash ledgers, with the ability to post transactions from the Leading Ledger to the Modified Cash Ledger based on preselected criteria while posting in real time to the Statutory Accrual and Statutory Cash Ledgers. This has never been done before on any system, including an ERP system or various other similar systems until development of the present inventive system.

SUMMARY

The present invention consists of a system and method comprising a process to provide an accounting basis including cash and accrual ledgers in an efficient and simple to use manner. The present invention may be implemented on any conventional or on any general-purpose computer system not limited to: desk top computers, laptop computers, tablets, or cell phones and the like. A keyboard and mouse can be used for introducing user input to the computer system and communicating that user input to the CPU. The computer system may also include main memory, video memory, and mass storage, which may be shared on a network, or it may comprise a dedicated mass storage, application server or cloud-based system. The inventive computer system described above is for purposes of one example of a preferred embodiment only. The present invention may be implemented manually or in any type of computer system or programming or processing environment and on a wide variety of CPU's, including solid state and/or EEPROM based systems.

The Modified Cash Ledger Basis of Accounting comprises a highly efficient and easy to use process providing for a combination of accrual and cash accounting that can be enabled on ERP systems, as well as a wide variety of other systems commonly employed in the relevant marketplace. Because this accounting basis is primarily for use in professional firms, including but not limited to: professional services firms such as accounting firms, law firms, architecture firms and the like many of which manage their accounting on systems such as ERP or similar systems, this invention will allow for a vastly improved streamlined, cost effective and proprietary accounting process.

The Modified Cash Ledger Basis for an Accounting System and Process allows for consolidated reporting for firms or other business entities as well as their local offices. The present invention provides for an improved accounting system and method which allows for real time updating of statutory accrual ledgers and statutory cash ledgers for local office needs, while maintaining in real time a management cash ledger capable of recording all posts of each firm or office for the management ledger.

In the following description, specific details are set forth in order to provide a more thorough description of the present invention. It will be apparent, however, to one skilled in the art, that the present invention may be practiced without some of these specific details. In other instances, well known features have not been described in detail so as not to obscure the invention. Other combinations and well known elements in the art may also be utilized and substituted and should be considered as part of the invention claimed.

OBJECTS

Thus, one primary objective of the present invention is to provide a firm, company or other professional or business entity the ability to achieve one or more of the following preferred goals: provide an improved and modified accounting system and method capable of recording transactions on both cash and accrual basis, which is able to enhance the firm's ability to manage and provide data in a harmonized, consolidated fashion in all cities and countries in which the firm conducts business by providing income and expense data displayable in a plurality of currencies which are updated at set intervals. For example, this data may be updated several times a day, daily, weekly or other set interval, or it can be set to update in real time.

Another primary objective of the present invention is to increase efficiency and profitability of a company or other business entity by reducing the local and global costs associated with maintaining disparate systems and processes among differing companies and firms by providing a consolidated system utilizing standardized ledgers between locations. A consolidated global system eliminates data redundancy, and is more expedient and cost effective. Also, the present invention provides for the ability for the Management Cash Ledger to maintain all the local office ledgers (cash and accrual) in one ledger in real time.

Still yet a further primary objective of the present invention is to provide a Modified Cash Ledger Accounting System that may operate on ERP and other systems commonly utilized in the relevant marketplace.

Another primary objective of the present invention is to reduce quarterly and year-end financial support schedules as well as generate reports required for tax reporting and payment purposes. By providing a Management Cash Ledger, this helps to generate quarterly and yearly reports without difficulty and can be scheduled to run automatically at user-preferred intervals.

An additional primary objective of the present invention is to eliminate the need to reconcile local books to global books, as this occurs automatically as part of the improved process, as set forth herein. Further, this is enabled in one set currency, thus consolidating all the books into one management ledger. The present invention also provides for the local statutory requirements to be applied and recorded in real time in statutory cash or statutory accrual ledgers as they are entered into the leading ledger.

Another primary objective of the present invention is to enable global transactions that used to be posted by global staff to now be posted by local personnel, and said transactions also may be accessed by personnel from local or global locations, thereby eliminating the need for each office to post at their home office location only, and then undergo reporting and consolidation of the various office reports.

Still another primary objective of the present invention is to enable non-local transaction entries to be posted automatically. This means users will have no need to post non-local transactions each month, thereby eliminating the need for users to post when they return to their home office and then consolidate reports to combine all office location reports. The present inventive method provides this may be now all done automatically, in one step. The primary objectives attained by this inventive system and method center around its ability to deliver a Modified Cash Ledger with the advantage of being able to maintain a plurality of cash and accrual based ledgers simultaneously.

The present invention provides an improved method that allows for manual entries to be made into each of the parallel ledgers (statutory accrual cash, statutory cash ledger, and management cash ledger) thereby allowing for an easy to use way to adjust or manipulate a plurality of ledgers.

It is still a further primary objective of the present invention to increase flexibility and responsiveness to the firm's strategic and client requirements by providing multiple real time updating of sub ledgers.

Another primary objective of the present invention is to reduce financial process operating costs through standardization and eventually centralization of some core processes, such as the general ledger, and to reduce current and future technology costs by providing minimal reports with optimal information on each report. For example, costs for the maintenance and debugging of the existing technology are reduced, the system also reduces labor costs by providing for rules that may not be automated in a system and are no longer performed by individuals.

Still yet another primary objective of the present invention is to provide the ability to maintain a plurality of cash and accrual ledgers in ERP and other similar systems and to help the firms' offices reduce costs and meet local fiscal and statutory requirements effectively.

Also, a primary objective of the present invention is to ensure that the firm's financial systems operate on current technology including, but not limited to premise and cloud based technologies.

These and other objects and advantages of the present invention can be readily derived from the following detailed description of the drawings taken in conjunction with the accompanying drawings present herein and should be considered as within the overall scope of the invention, as well as all features which are or may be commonly known in the relevant marketplace to those considered skilled in the art shall be considered as being incorporated into the scope of the invention claimed as if they were fully set forth herein.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIG. 11 shows a front plan elevational view of an exemplary screen shot of the present invention in actual use.

DETAILED DESCRIPTION OF THE PRESENT EMBODIMENTS

Figure 1:
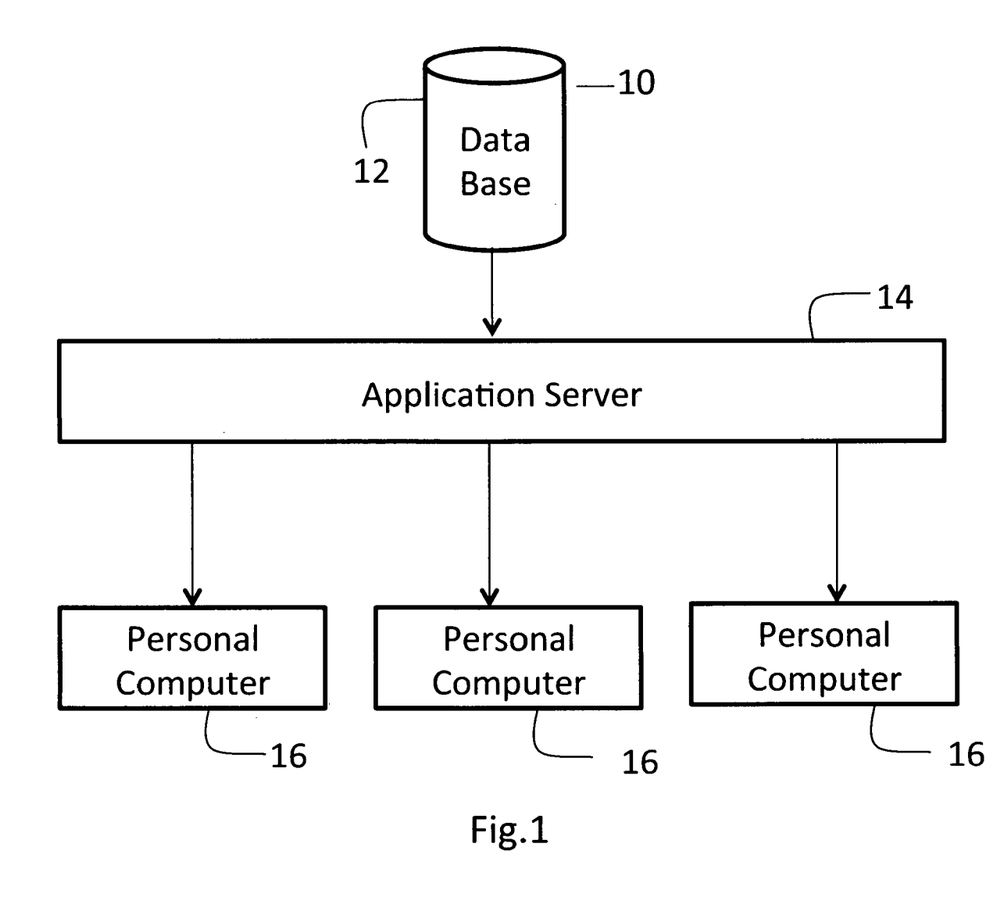
FIG. 1 shows a schematic diagram of the system architecture for the present invention.

Shown now in FIG. 1 is a flow chart diagram of the present inventive system, The Improved Ledger Accounting System 10 which is typically run in association with the following hardware elements: an application server 14 which communicates with data base 12 wherein data regarding payments, invoices, transactions and information pertaining to the particular user's business is stored therein. The Improved Ledger Accounting System 10 may be utilized with a plurality of personal computers 16, tablets, phones or other like devices accessible by the end user of the present inventive system, Improved Ledger Accounting System 10. The Improved Ledger Accounting System 10 can be utilized by a wide variety of different types of professional and non-professional businesses, including, but not limited to: architectural firms, law firms, accounting firms, vendors and contractors for services such as plumbing, auto service, construction and the like. This present inventive System is unique in that it combines cash and accrual local accounting ledgers as well as management accounting systems into one unified platform which is readily accessible by any parent corporation or head business entity to monitor the cash systems and cash flow of individual subsidiary businesses. The local or subsidiary businesses also have their statutory required ledgers maintained in real time (with statutory requirements applied to all financial events) while reporting to their management ledger at the same time. The subsidiary businesses may be located in one local area such as a town or city, or they may be state wide, regional, national or even international. The subsidiary businesses may be operating on plurality of international currencies, or it may be restricted to one currency for all transactions. If operating on several international currencies, the management accounting ledger may consolidate all records into one currency updated in real time or other preselected time.

Figure 1A:
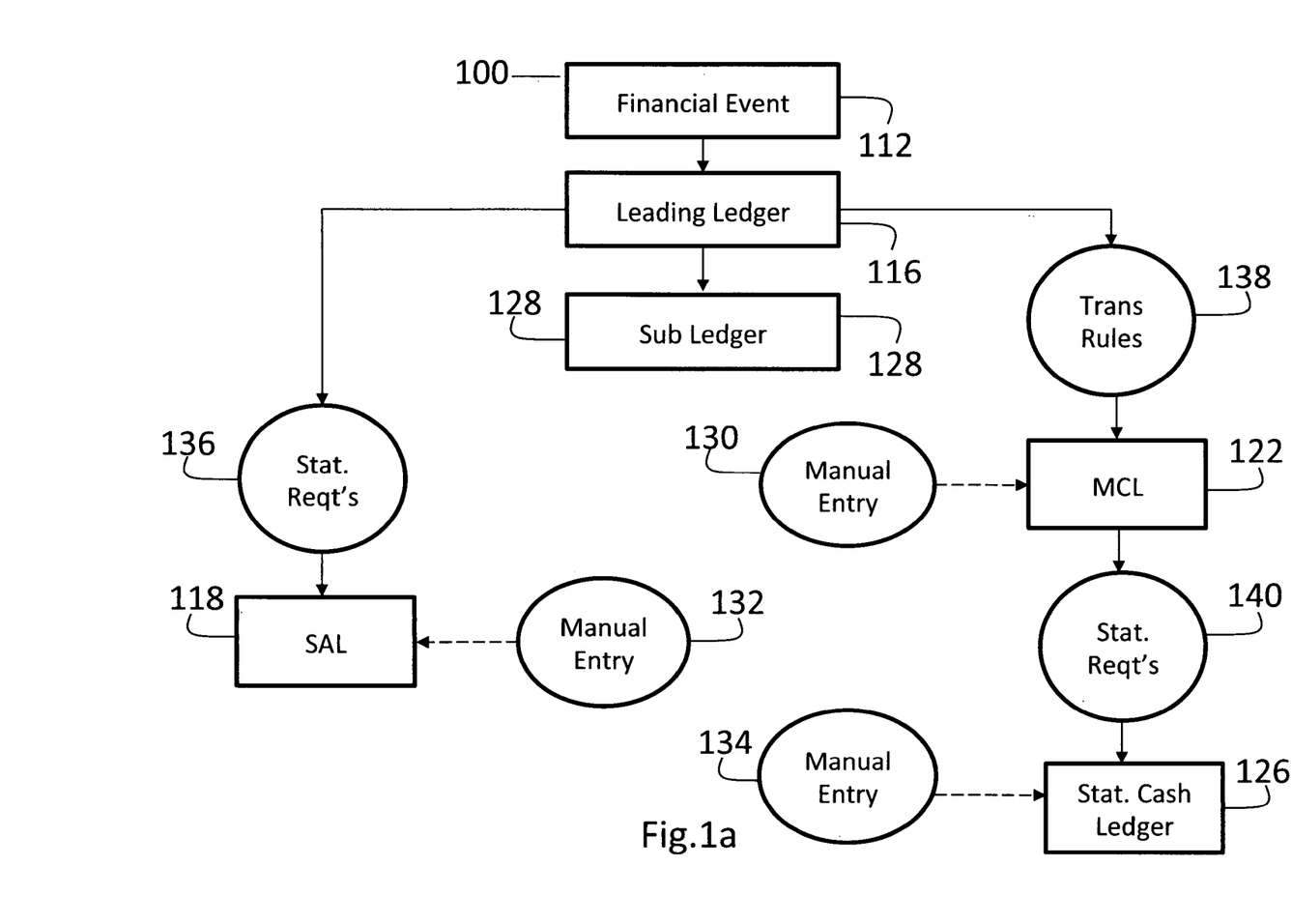
FIG. 1a shows a flow chart diagram of a preferred embodiment of the present invention.

FIG. 1a shows a flow chart showing the detailed information pertaining to actual operation of the present inventive system, Improved Ledger Accounting System 100 wherein journal entries and business transactions or any such financial event 112 is entered into the leading ledger 116. Every financial event such as a payment, disbursement, invoice or bill, etc. is entered into the leading ledger 116. This flow chart illustrates the mapping rules for sub-ledgers 128 which are part of leading ledger 116 and non-leading ledgers, if any. According to triggers and a predetermined set of rules, the location of the posting occurs based on preselected mapping/rules, which eventually end up in the management cash ledger 122, or based on the classification of the accounting basis used by the office involved, the relevant data are posted to the statutory cash ledger 126 in real time or statutory accrual ledger 118 in real time, or the process ends if they are not posted to any other ledgers. In an office or entity that utilizes accrual based accounting, statutory requirements 136 are applied to the postings in real time and posted into a statutory accrual ledger 118. In this same office that utilizes accrual based accounting, transfer rules 138 are applied to the postings input into the leading ledger and posted to the management cash ledger 122. The financial data 112 entered into the inventive system are manipulated by some or all of the following processes: the statutory accrual ledger 118 receives modified data according to statutory requirements 136 in real time; the management cash ledger 122 receives modified data according to transaction rules 138; and the statutory cash ledger 126 receives data modified to meet statutory requirements 140 in real time as they are posted into the management cash ledger 122. Posts can be made to the management cash ledger 122, statutory cash ledger 126, or statutory accrual ledger 118, or they can be made on a manual basis as well to each of the three ledgers 130, 134 or 132. The sub ledgers 128 depend from the leading ledger 116 and may consist of one or more of the following: accounts receivables, accounts payables and/or fixed asset accountings.

Figure 2:
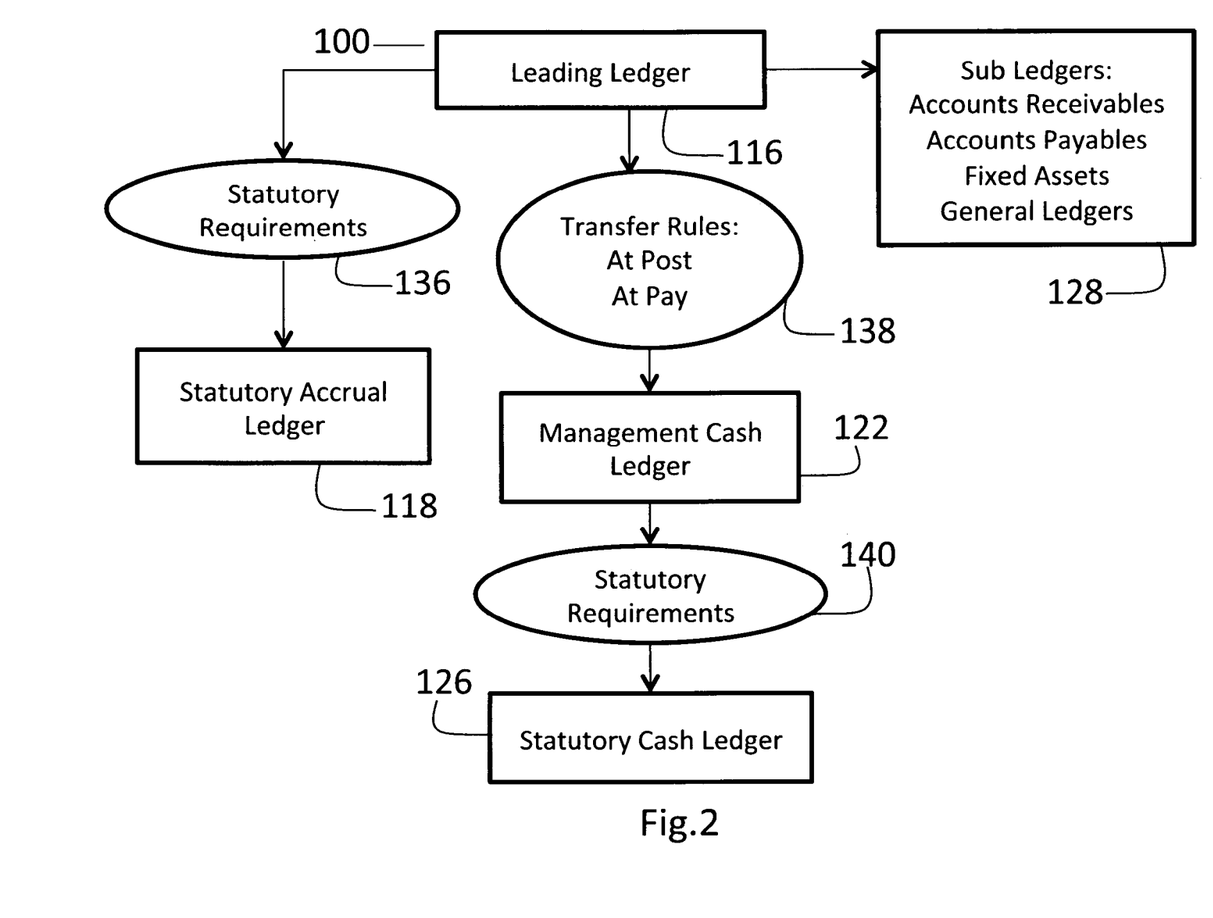
FIG. 2 shows a flow chart diagram of a preferred embodiment of the present invention.

Shown in FIG. 2 is a flow chart for the present invention, Improved Ledger Accounting Method 100 which allows for a modified or management cash ledger 122 to be used in professional firms or for other professional or personal use. This parallel ledger functionality is used to meet reporting requirements on a cash or accrual basis by providing information from the following ledgers: management cash ledger 122, statutory cash ledger 126 and statutory accrual ledger 118. For example, the management cash ledger 122 may be used to calculate retained earnings for partnership distributions. In this process, there are several types of ledgers, namely: a leading ledger 116 comprising a ledger integrated with subsidiary ledgers 128 of FIG. 1a, and updated in all company codes; and a non-leading ledger—a parallel ledger to the leading ledger 116, that allows for alternative accounting principle postings. Non-leading ledgers such as the management cash ledger 122, statutory accrual ledger 118, etc. may have different fiscal year variants and different posting period variants per company (or entity) code and may, for example, be used for management cash ledgers 122 and statutory cash ledgers 126; and, sub-ledgers 128 wherein the subsidiary ledgers 128 is a subset of the general or leading ledger 116 used in the company's accounting. This process allows for a plurality of each of these ledgers (Non-leading such as management cash ledgers 122, statutory accrual ledgers 118, statutory cash ledgers, and sub-ledgers 128) to be maintained collectively.

The Improved Ledger Accounting System 100 process has the ability to post all transactions that are captured in the first or leading ledger 116 and are then able to be evaluated based on preselected events and rules 140 before being posted to the modified statutory cash ledger 126. The process functionality of the modified statutory cash ledger 126 is one that is embedded and allows leading ledger 116 transactions to post automatically to this ledger.

The Improved Ledger Accounting Method 100 has the ability to post transactions to the statutory cash ledger 126 based on preselected criteria such as events, account numbers, document types, and other conditions. Through a trigger mechanism these preselected criteria are able to control modified statutory cash ledger 126 postings, based on the specific criteria preselected such as Document Types/Events. For example, the document types that can be input into the Improved Ledger Accounting Method 100 may involve a key that distinguishes the business transactions to be posted. The document type can be used to determine where the document is stored and specify the account types to be posted.

Another important feature and function of the Improved Ledger Accounting System 100 is its ability to post a ledger-specific posting to a non-leading ledger such as the management cash ledger 122, management allocations, or statutory only posting, or another selected ledger. The non-leading ledgers can include, for example, the modified cash ledgers 122 and the statutory cash ledgers 126 and the statutory accrual ledgers or other defined Ledgers as specified by the user of the System. This accounting basis process allows for the ability to post transactions in a non-leading ledger (such as statutory accrual ledger 118, statutory cash ledger 126, etc.) to an account different from the leading ledger 116. A unique feature of the inventive process Improved Ledge Account System 100 is its ability to maintain multiple modified management cash ledgers 122 for example, management cash ledger 122 and statutory cash ledgers 126, etc.

An important feature of the present invention is that the Improved Ledger Accounting Method 100 provides for the ability to post to open items and reconciliation accounts in the Non-Leading Ledger. Further the process enables ledger specific foreign exchange revaluation, including revaluation based on the general or leading ledger balance. Also, the ability to run foreign currency revaluation independently for specific purposes such and management and statutory purposes. An aspect of this inventive process is that exchange rates are input into the system daily, management rates will be maintained for all firm currencies, statutory rates will be maintained for countries that have a government mandate for the rate source, and every transaction is saved in a plurality of currencies as preselected by the firm (for example, document currency, statutory reporting/company code currency), and group currency and when a government mandates the rates that must be used in a jurisdiction, transactions are also saved in that currency (the hard currency). The process also allows for other selections to be input into the system.

A novel and unique aspect of the present inventive process is the reconciliation between the management cash ledger (non-leading) 122 and the leading ledger 116. Another unique feature of the present invention is the ability for the management cash ledger 122 postings to post at real time or via on demand or through batch processing.

Within the process, all documents must carry the same transactional attributes in the management [modified] cash ledger 122 as they do in the leading ledger 116, with the exception of an alternative account mapping to management cash ledger(s) 122, where necessary.

The transaction flow of this process starts with business transactions or journal entries or other financial events FIG. 1a's 112 generated from accounts payable or accounts receivable or other transaction post to the leading ledger 116. If the local firm is run on an accrual accounting system, statutory requirements are applied to the posts made in the leading ledger 116 and posted to the statutory accrual ledger in real time. Transfer rules are applied to all posts made in the leading ledger 116 and if they qualify according to a set of predetermined rules and triggers, they are posted to the management cash leger 122. If the firm or office follows a cash accounting basis, the statutory requirements are applied to the posts made into the management cash ledger 122 and are posted to the statutory cash ledger 126. The process ensures proper allocation of partial client payments in the modified cash ledger 122. For example, a portion of the client invoice is brought into the management cash ledger 122 proportionate to each amount of any partial payment made to a vendor. Also, proper handling of inter-company transactions between the leading ledger 116 and the management cash ledger 122 are ensured in this process. This includes proper population of the inter-company ledger headed in the modified cash ledger 122 which takes place when a portion of the inter-company client invoices or vendor payment has been bought into the modified cash ledger 122 proportionate to each amount of partial payment with inter-company populated consistent with the original document.

An additional advantageous feature of the present invention is the process' ability to produce management reports quickly and efficiently from the management cash ledger 122, including specific fields such as, Trial Balance, Profit & Loss, and Balance Sheet, etc. Further, the present inventive process or method has the ability to have Leading Ledger 116 data rendered into reports, and it may additionally produce other detailed reports based on the management cash ledger 122. Further, the present inventive process has the ability to create specific repots such as, for example, Statutory reports from the statutory cash ledger 126, including country specific Profit & Loss Statements, and a Balance Sheet. Leading ledger 116 data for business intelligence must be extracted from the modified cash ledger 122 and other non-leading ledgers for reporting purposes.

This inventive process also has the ability to create Comparative Financial Statements against Budget based on the management cash ledger 122. The process has the ability to use Internal Orders in the modified management cash ledger 122. The process has the ability to create ProfiUCost Center reporting out of the management cash ledger 122 and has the ability reconcile tax reporting to the modified management cash ledger 122.

Figure 3:
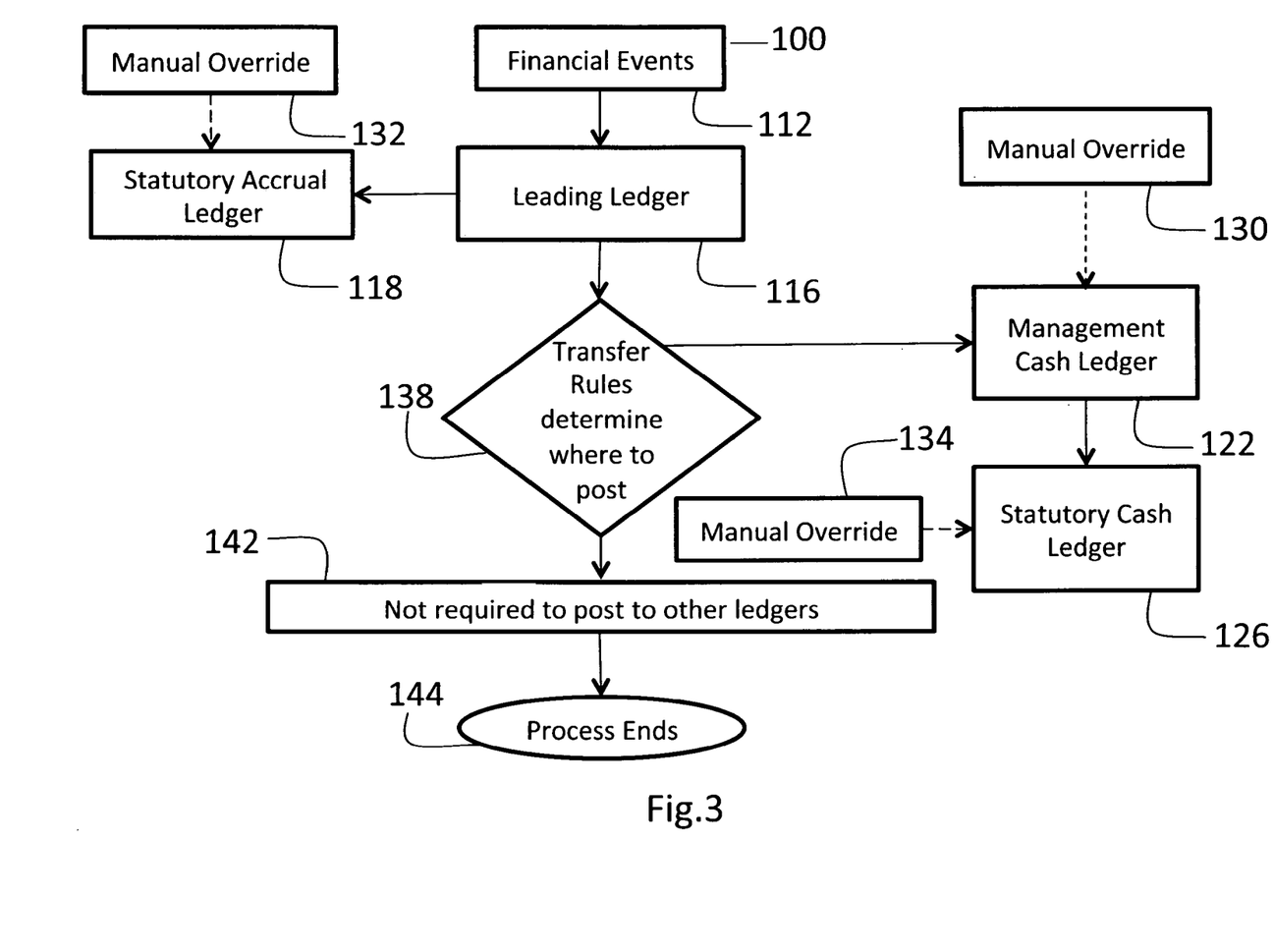
FIG. 3 shows a flow chart diagram of a preferred embodiment of the present invention.

FIG. 3 shows an additional flow chart of the present inventive system, Improved Ledger Accounting System 100 which shows how a financial event 112 such as a payment, bill, disbursement, or other transaction is created and it is then entered into the leading ledger 116. For companies or business entities using statutory accrual ledger 118 accounting, this transaction is entered directly into that ledger. Of course, where desired, a transaction may be independently created and entered into the inventive system via the manual override or manual entry 132 is created.

In instances where a company or business entity utilizes a statutory cash ledger 126, a financial event 112 such as a payment, bill, invoice, disbursement or other transaction is created and then the present inventive system will use a set of transfer rules 138 to determine where to post the entry. In some situations, there may be no need to post to other ledgers 142 and so the inventive process ends 144. In other situations, via the transfer rules 138, the posting is placed in a management cash ledger 122 and into a statutory cash ledger 126. Of course, a manual override may be utilized to create a manual entry 130 in the management cash ledger, or a manual override maybe utilized to create a manual entry 134 into the statutory cash ledger.

Figure 4:
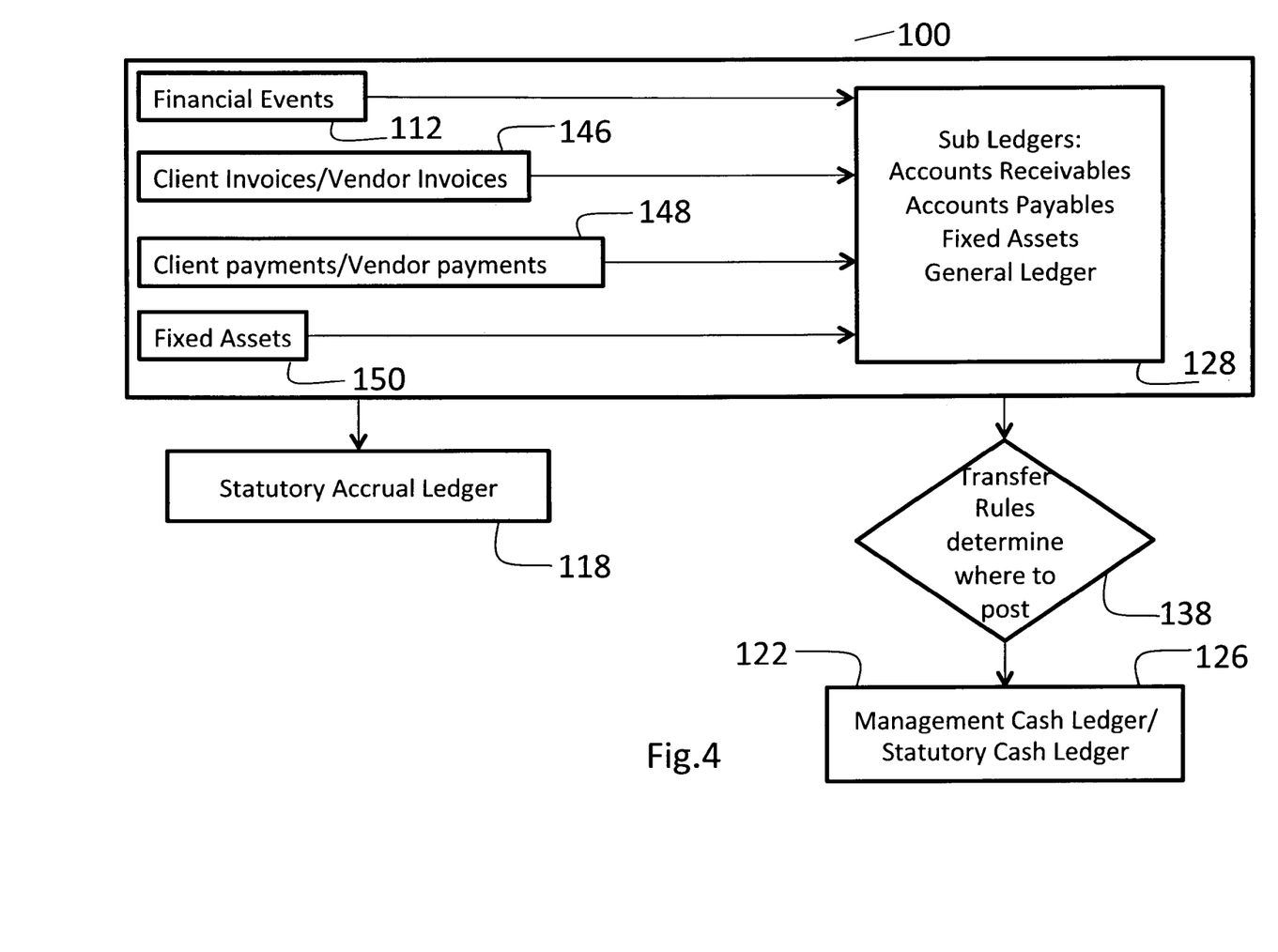
FIG. 4 shows a flow chart diagram of a preferred embodiment of the present invention in actual use.

FIG. 4 shows an additional flow chart for the Improved Ledger Accounting System where in the details of sub ledgers 128 are shown. Sub ledgers 128 may comprise one or more of the following: accounts receivables or payables, fixed assets or the general ledger. Entered into the sub ledgers are the following transactions: financial events 112, client invoices/vendor invoices 146; client payments/vendor payments 148 and fixed assets 150. This data is then automatically entered into the statutory accrual ledger 118. Or a set of transfer rules may be utilized to place the data also into the management cash ledger 122 or the statutory cash ledger 126.

Figure 5:
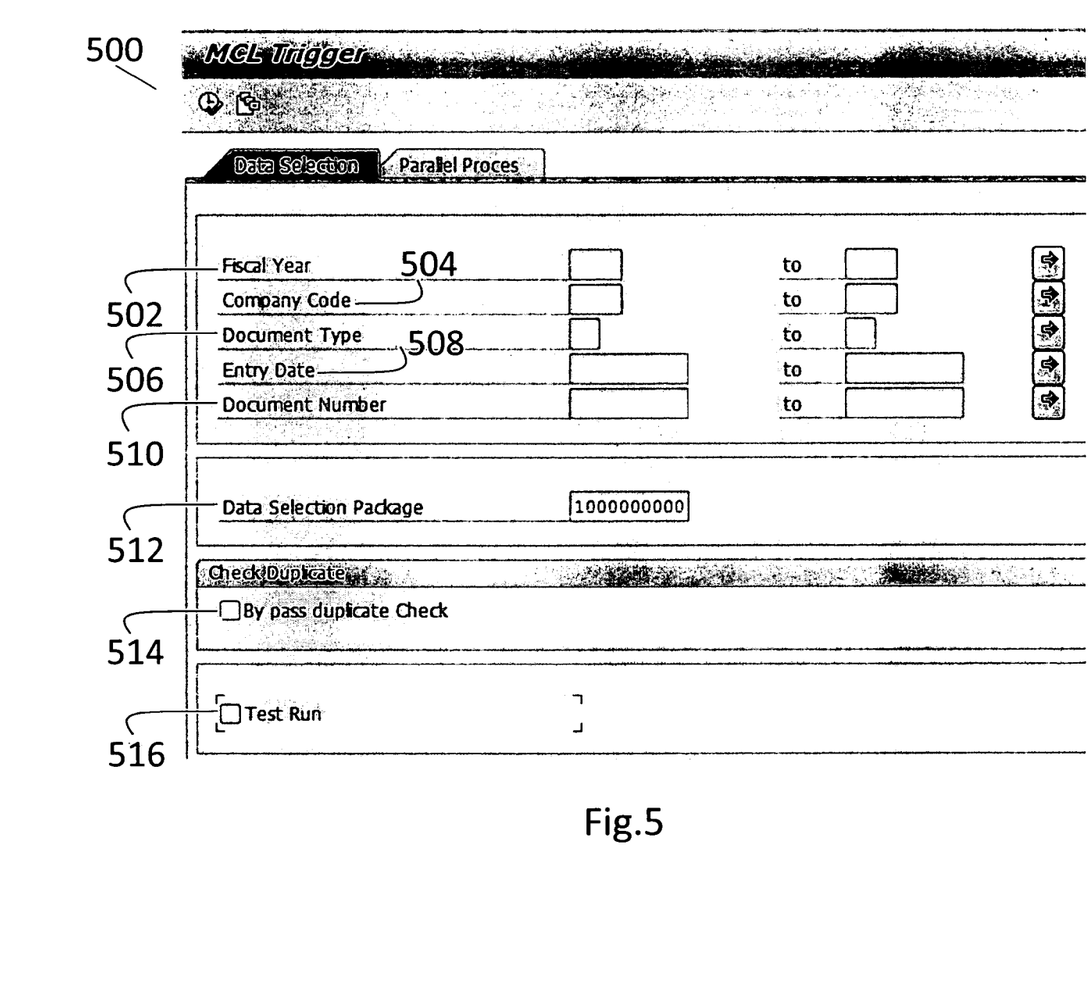
FIG. 5 shows a front plan elevational view of an exemplary screen shot of the present invention in actual use.

FIG. 5 shows a typical screen for an MCL trigger screen 500 which is for the management cash ledger 122 of FIGS. 1a to 4. This screen shot also shows the following elements: fiscal year 502, company code 504; document type 506; entry date 508; document number 510; data selection package 512; by pass duplicate check 514 and test run 516. In such a manner, the user may display or report the desired and selected information he or she chooses. The document number 510 can be used to create a unique document identifier in the system. The document selection package can be used to select from the desired documents.

Figure 6:
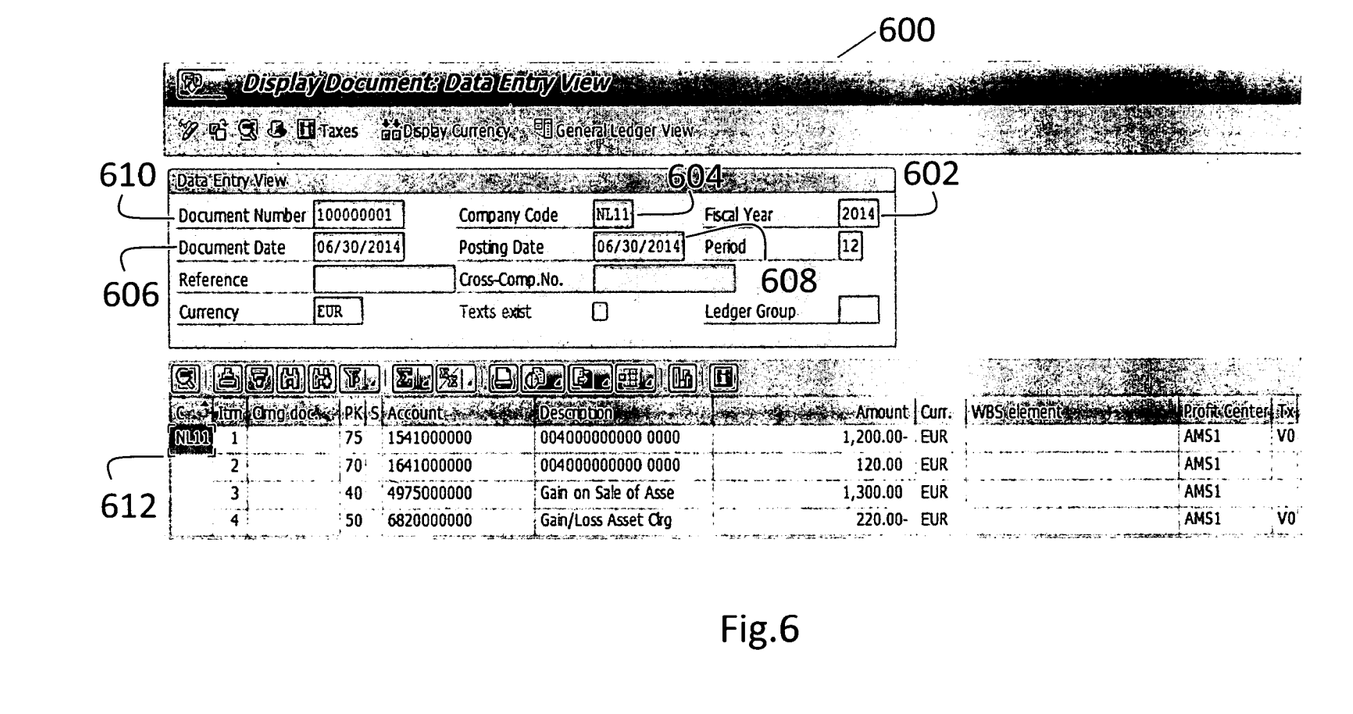
FIG. 6 shows a front plan elevational view of an exemplary screen shot of the present invention in actual use.

FIG. 6 shows a typical screen for data entry, data entry screen 600. In this view, the following items are easily found: fiscal year 602; company code 604; document date 606; posting date 608; document number 610 and a plurality of lien item entries for transactions 612. It should be noted that the posting date 608 may differ from the document creation date 606.

Figure 7:
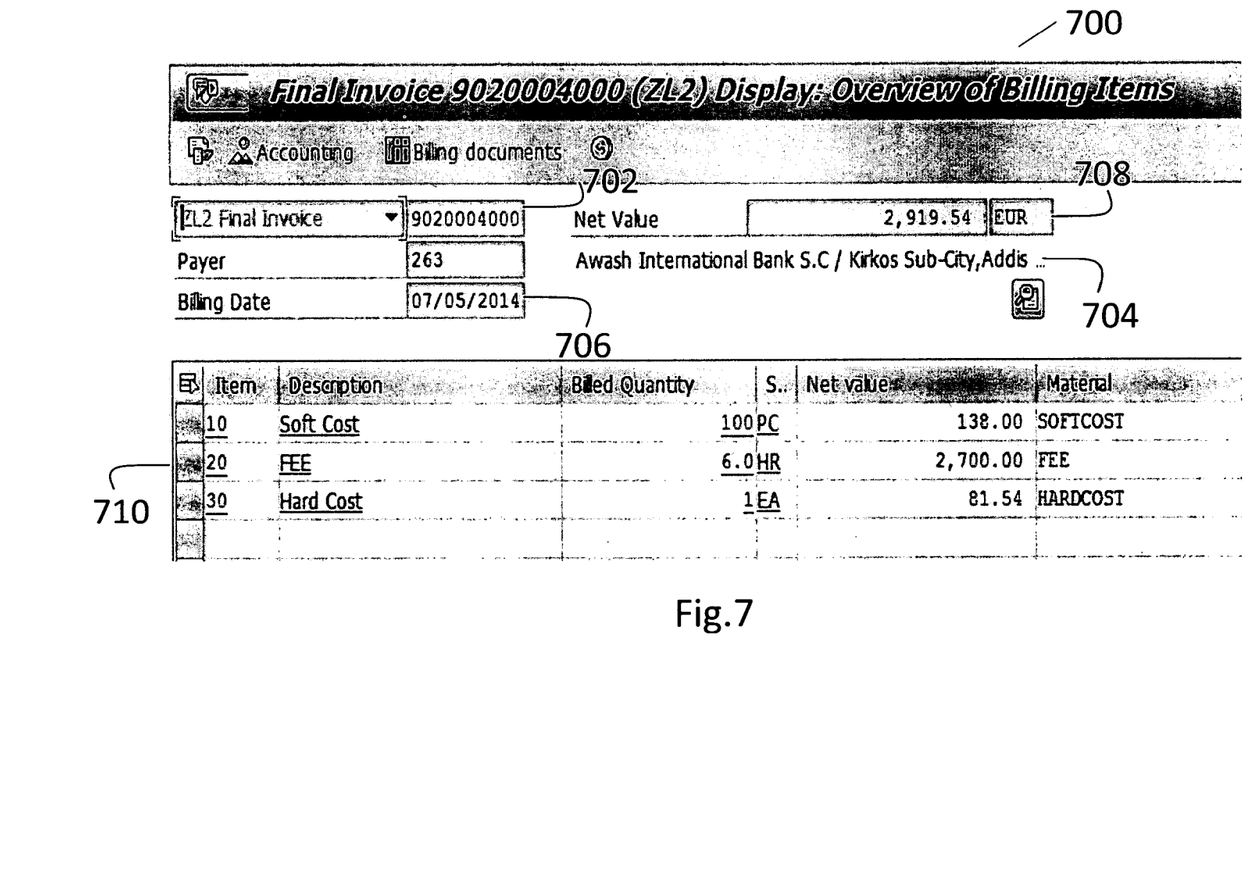
FIG. 7 shows a front plan elevational view of an exemplary screen shot of the present invention in actual use.

FIG. 7 shows a typical screen for a final invoice containing an over view of billing items or final invoice screen 700 which displays the following items: final invoice number 702; client name and number 704; bill date 706; bill value 708 and a plurality of cost entries 710. Once assembled together and printed, this comprises the billing for a particular client.

Figure 8:
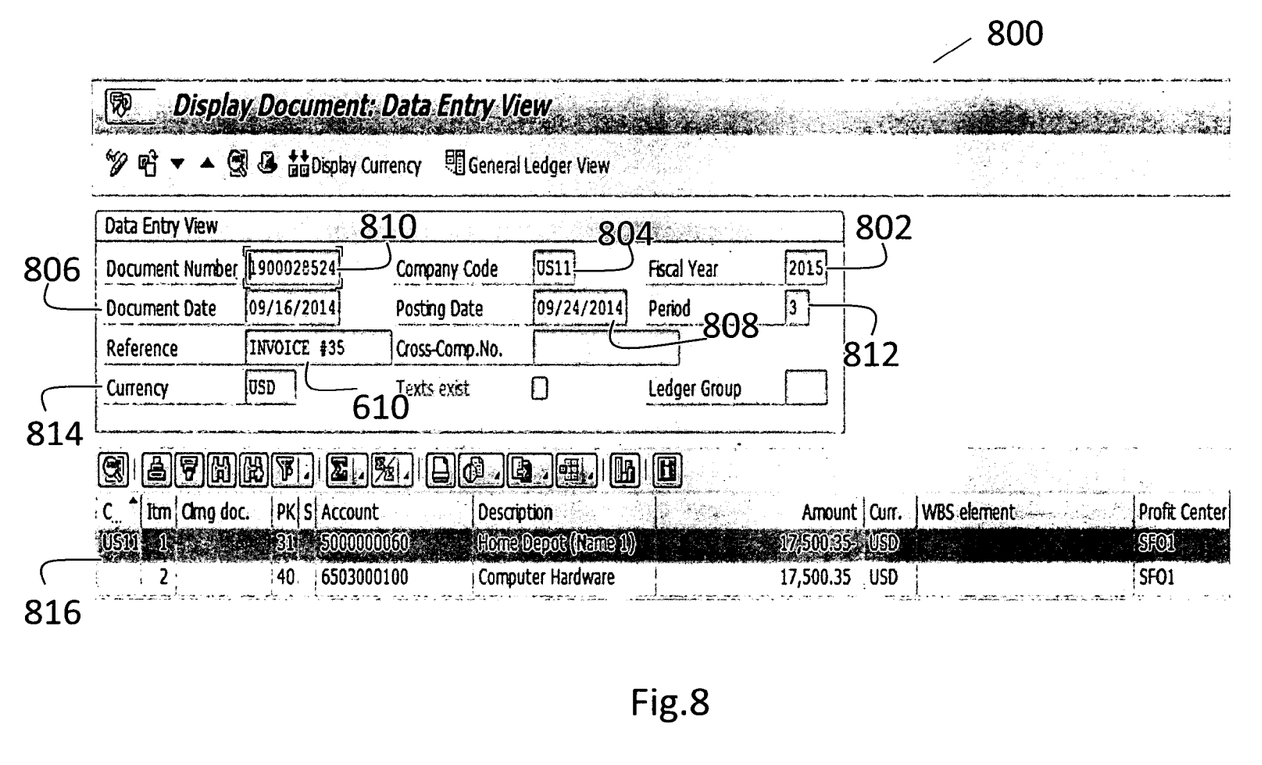
FIG. 8 shows a front plan elevational view of an exemplary screen shot of the present invention in actual use.

FIG. 8 shows a typical screen for a particular vendor invoice, vendor entry screen 800. In this screen, the following items are displayed to the user: fiscal year 802; company code 804; document date 806; posting date of invoice 808; document number 810 which is a unique identifier for this invoice; accounting period 812; currency type 814; and plurality of items billed to client 816.

Figure 9:
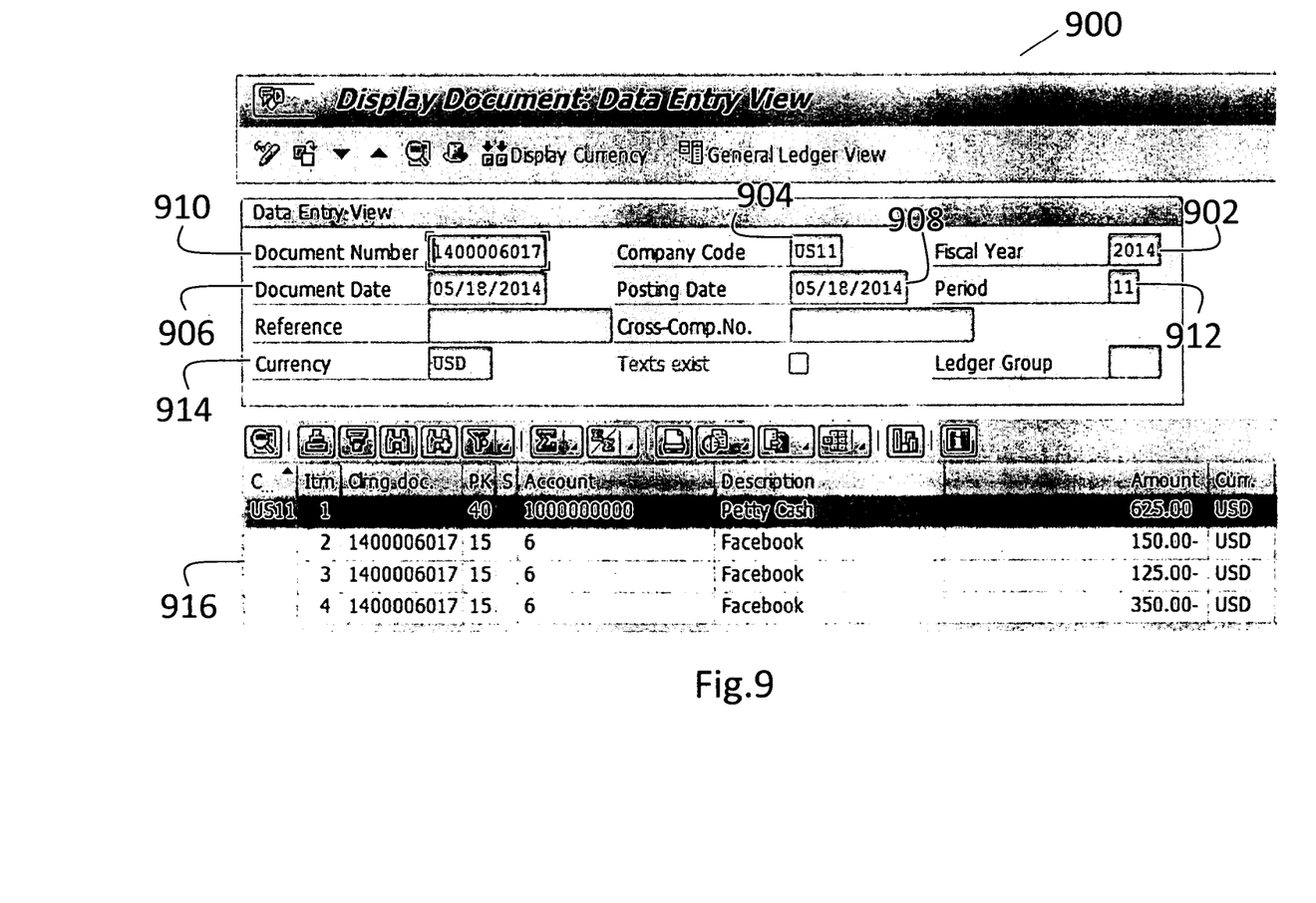
FIG. 9 shows a front plan elevational view of an exemplary screen shot of the present invention in actual use.

FIG. 9 shows a typical screen displayed for each client payment entered into the inventive system, payment screen 900 which displays the following data: fiscal year of payment 902; company code 904; document date 906; posting date 908; document number 910, which is a unique document identifier; fiscal period 912; currency type 914 and a plurality of payment entries 916.

Figure 10:
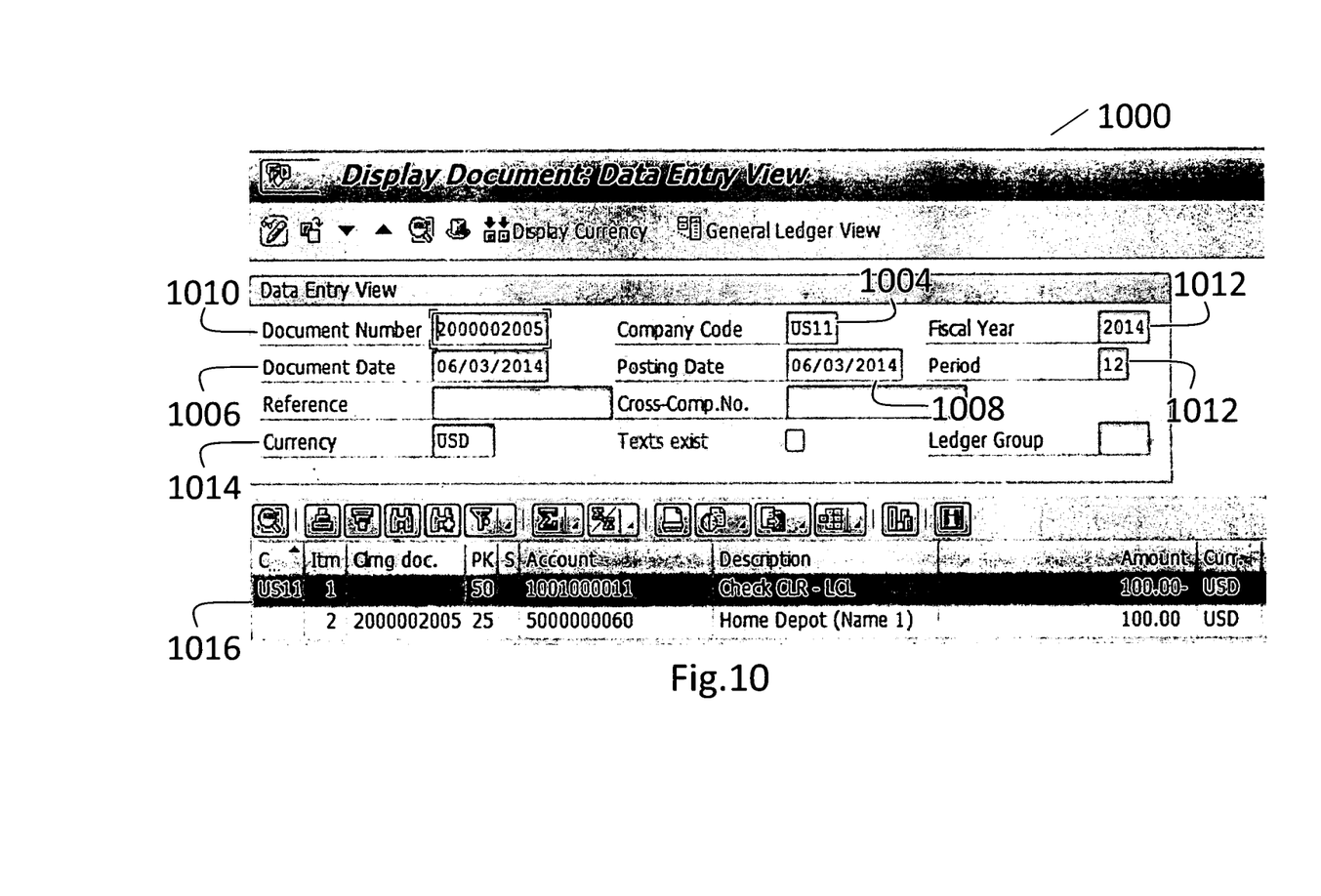
FIG. 10 shows a front plan elevational view of an exemplary screen shot of the present invention in actual use.

FIG. 10 shows a typical screen displayed for each vendor payment entered into the inventive system, vendor payment screen 1000 which displays the following data; fiscal year of payment 1002; company code 1004; document date 1006; posting date 1008; document number, a unique identifier 1010; fiscal period of payment 1012; currency type 1014 and payment entry 1016.

FIG. 11 shows a typical screen displayed for a fixed asset data entry 1100 which displays the following data; fiscal year of asset value 1102; company code 1104; document date 1106; posting date 1108; document number or identifier 1110; fiscal period at entry 1112; currency type of record 1114 and the asset's value at the time of entry 1116. In such a manner, the value of assets held by a related or subsidiary company may be tracked for accounting, tax or other valuation purposes.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. An accounting system, configured to manage financial data from a plurality of computer devices, the accounting system comprising:
a database;
an application server comprising a processing device and a non-transitory storage medium for storing instructions that when executed by the processing device cause the processing device to perform the following in real time:
receive, by the database, financial data associated with different document types from the plurality of computer devices, the different document types having different keys;
store, by the application server, the financial data in a leading ledger database implemented in the database;
process, by the application server, the financial data according to pre-defined transfer rules, wherein:
a management cash ledger database receives at least some of the financial data from the leading ledger database in real time, the management cash ledger database maintaining global financial data for a plurality of local offices;
a statutory cash ledger database automatically receives, based on a trigger mechanism determining that at least one of the keys for the different document types is a preselected type, at least some of the financial data from the management cash ledger database in time, time which is modified according to statutory rule requirements for the statutory cash ledger database, the statutory cash ledger database maintaining first local financial data for one of the plurality of local offices; and
a statutory accrual ledger database automatically receives at least some of the financial data from the leading ledger database in real, time which is modified according to statutory rule requirements for the statutory accrual ledger database, the statutory accrual ledger database maintaining second local financial data for one of the plurality of local offices.

2. The accounting system of claim 1, wherein the financial data corresponds to any one of: client invoices, vendor invoices, client payments, vendor payments, and fixed assets.

3. The accounting system of claim 1, wherein those executable instructions that, when executed by the processing device, cause the management cash ledger database to receive at least some of the financial data from the leading ledger database, are further operative to store the financial data that is classified under both accrual and cash accounting.

4. The accounting system of claim 3, wherein the financial data stored in the management cash ledger that is classified under both accrual and cash accounting is modified into a uniform currency.

5. The accounting system of claim 1, wherein those executable instructions that, when executed by the processing device are further operative to relocate financial data from the leading ledger database to the statutory accrual ledger database when the pre-defined transfer rule is at post.

6. The accounting system of claim 1, wherein those executable instructions that, when executed by the processing device are further operative to relocate financial data from the management cash ledger database to the statutory cash ledger database when the pre-defined transfer rule is at pay.

7. The accounting system of claim 1, wherein the processing device is configured to calculate retained earnings for partnership distributions using the management cash ledger database.

8. The accounting system of claim 1, wherein the management cash ledger database and the statutory accrual ledger database maintain different fiscal year variants.

9. The accounting system of claim 1, wherein the management cash ledger database and the statutory accrual ledger database maintain different posting period variants.

10. The accounting system of claim 1, wherein the statutory cash ledger database maintains a country-specific profit and loss statement.

\* \* \* \* \*